United States Patent
Tzeng (10) Patent No.: US 9,518,686 B2
(45) Date of Patent: Dec. 13, 2016

(54) THREADED PIPE ASSEMBLY FOR USE IN A VALVE CARTRIDGE OF A SEPARABLE WATER FAUCET AND METHOD FOR MANUFACTURING SAME

(71) Applicant: DAHATA INC., Jiangmen, Guangdong (CN)

(72) Inventor: Jeffery Tzeng, Jiangmen (CN)

(73) Assignee: DAHATA INC., Jiangmen (CN)

( * ) Notice: Subject to any disclaimer, the term of this patent is extended or adjusted under 35 U.S.C. 154(b) by 115 days.

(21) Appl. No.: 14/578,514

(22) Filed: Dec. 22, 2014

(65) Prior Publication Data

US 2016/0178094 A1    Jun. 23, 2016

(51) Int. Cl.
| | |
|---|---|
| *F16L 13/10* | (2006.01) |
| *F16L 15/08* | (2006.01) |
| *F16K 11/00* | (2006.01) |
| *B29C 45/14* | (2006.01) |
| *B29D 23/00* | (2006.01) |
| *B29L 23/00* | (2006.01) |
| *B29K 705/02* | (2006.01) |

(52) U.S. Cl.
CPC .......... *F16L 13/10* (2013.01); *B29C 45/14614* (2013.01); *B29D 23/003* (2013.01); *F16K 19/006* (2013.01); *F16L 15/08* (2013.01); *B29K 2705/02* (2013.01); *B29L 2023/22* (2013.01)

(58) Field of Classification Search
CPC ......... F16L 13/10; F16L 15/08; F16K 19/006; B29C 45/144667; B29C 45/14614; B29D 23/003
USPC ............................................. 137/315.12, 801
See application file for complete search history.

(56) References Cited

U.S. PATENT DOCUMENTS

| | | | | |
|---|---|---|---|---|
| 3,770,004 A | * | 11/1973 | Johnson et al. | .... F16K 27/0263 137/315.12 |
| 8,240,326 B2 | * | 8/2012 | Kacik et al. | .............. E03C 1/04 137/315.12 |

* cited by examiner

*Primary Examiner* — Kevin Lee (57) ABSTRACT

One embodiment of the present invention relates to a threaded pipe assembly for use in a valve cartridge of a separable water faucet. The threaded pipe assembly includes a valve body, an aluminum casing pipe defining an external thread, a water inlet pipe and a water outlet pipe. The valve body is positioned in the aluminum casing pipe via injection molding. The water inlet pipe and the water outlet pipe are fixed to the valve body via injection molding. According to one embodiment of the present invention, the water inlet pipe, the water outlet pipe and the aluminum casing pipe are safely secured to the valve body via injection molding, which can simplify assembly process of the separable water faucet as well as avoid water leakage risk due to welded connection.

18 Claims, 5 Drawing Sheets

THREADED PIPE ASSEMBLY FOR USE IN A VALVE CARTRIDGE OF A SEPARABLE WATER FAUCET AND METHOD FOR MANUFACTURING SAME

FIELD OF THE INVENTION

The present invention generally relates to water faucets and, more particularly, to a threaded pipe assembly for use in a valve cartridge of a separable water faucet and method for manufacturing the same.

BACKGROUND OF THE INVENTION

Conventional threaded pipe assembly for use in a valve cartridge of a separable water faucet generally includes a concentric or eccentric valve body, a mounting pipe defining an external thread, a water inlet pipe and a water outlet pipe. The water inlet pipe and the water outlet pipe are copper pipes fixed to the valve body respectively. The mounting pipes are set around the joints of the water inlet pipe/water outlet pipe and the valve body. A valve cartridge seat is disposed in the concentric valve body.

However, each component of the threaded pipe assembly in the conventional design is manufactured independently prior to be assembled mainly via welding, which may lead to poor assembly efficiency. The welding sections of the water inlet pipe and the water outlet pipe are readily to leak water and lead to water pollution.

In view of the above, what is needed, therefore, is to provide a threaded pipe assembly for use in a valve cartridge of a separable water faucet which can prevent water leakage and water pollution and method for manufacturing the same.

SUMMARY OF THE INVENTION

One object of the present invention is to provide a threaded pipe assembly for use in a valve cartridge of a separable water faucet which can prevent water leakage and water pollution and method for manufacturing the same.

According one embodiment of the present invention, a threaded pipe assembly for use in a valve cartridge of a separable water faucet is provided. The threaded pipe assembly includes a valve body, an aluminum casing pipe defining an external thread, a water inlet pipe and a water outlet pipe, wherein the valve body is fixed in the aluminum casing pipe via injection molding, and the water inlet pipe and the water outlet pipe are fixed to the valve body via injection molding.

According to one aspect of the present invention, the threaded pipe assembly further includes a stainless steel cover secured to one end of the valve body. The stainless steel cover defines two through holes for suitably receiving the water inlet pipe and the water outlet pipe respectively.

According to one aspect of the present invention, the valve body is a single injection molded component defining at least two snapping recesses at one end thereof. The stainless steel cover is a circular plate having an inner diameter corresponding to an outer diameter of the valve body and being provided with at least two positioning ribs each forming a protrusion extending towards a corresponding snapping recess in the valve body. The stainless steel cover is fixed to one end of the valve body via engagement of the protrusions and the snapping recesses.

According to one aspect of the present invention, the water inlet pipe and the water outlet pipe are both injected hoses.

According to one aspect of the present invention, an inlet end of the water inlet pipe is formed with a connector and a mounting nut defining internal thread is set around the connector.

According to one aspect of the present invention, the mounting nut is coupled with an adapter hose having an external thread, and a sealing gasket is disposed between the mounting nut and the adapter hose.

According to one aspect of the present invention, an outlet end of the water outlet pipe is formed with a clip-on quick connector configured to be connected to an external water outlet pipe.

According to one aspect of the present invention, the quick connector includes a connecting pipe fixed to an outlet end of the external water outlet pipe via injection molding and defining a receiving recess and at least one receiving slot, a resilient snapping component formed with a snapping protrusion received in the receiving recess of the connecting pipe, and at least one seal ring received in the at least one receiving slot.

According to one aspect of the present invention, the valve body is a single injection molded component defining at least two positioning slots at an outer surface thereof. The aluminum casing pipe has an inner diameter corresponding to an outer diameter of the valve body. The aluminum casing pipe includes at least two positioning ribs corresponding to the positioning slots of the eccentric valve body.

According to one aspect of the present invention, the valve body defines a receiving chamber configured for suitably receiving a valve cartridge and two connecting holes configured for suitably receiving the water inlet pipe and the water outlet pipe respectively.

According to one aspect of the present invention, the valve body is an eccentric valve body or a concentric valve body.

According to one aspect of the present invention, the threaded pipe assembly further includes a valve cartridge seat defining an inner hole. The valve cartridge seat is received in the receiving chamber of the concentric valve body and is in communication with the water inlet pipe via the inner hole.

According to one embodiment of the present invention, a method for manufacturing a threaded pipe assembly for use in a valve cartridge of a separable water faucet includes the steps of:

1) providing a preformed water inlet pipe and a preformed water outlet pipe, providing external connectors for the water inlet pipe and the water outlet pipe respectively; and 2) setting a preformed aluminum casing pipe defining an external thread, the water inlet pipe and the water outlet pipe in a mold and obtaining a valve body via injection molding, the molded valve body being fixed in the aluminum casing pipe and being coupled with the water inlet pipe and the outlet.

According to one aspect of the present invention, prior to setting the aluminum casing pipe, the water inlet pipe and the water outlet pipe in the mold, the water inlet pipe and the water outlet pipe first extend through a preformed stainless steel cover which is moved to ends of the water inlet pipe and the water outlet pipe afar from the aluminum casing pipe. The stainless steel cover is moved to the valve body and coupled to one end of the valve body via clip-on connection after the molded valve body being removed from the mold.

According to one aspect of the present invention, the water inlet pipe is an injected hose. An external connector of the water inlet pipe is manufactured according to the following steps: setting a preformed water inlet pipe in a mold and providing a connector coupled with the water inlet pipe at one end of the water inlet pipe via injection molding; and setting a mounting nut defining an internal thread around the water inlet pipe from one end of the water inlet pipe without the connector formed thereon, the mounting nut being not capable of being disconnected from the water inlet pipe due to obstruction of the connector.

According to one aspect of the present invention, after setting the mounting nut around the water inlet pipe, an adapter hose having an external thread is connected to the mounting nut. A sealing gasket is set between the mounting nut and the adapter hose.

According to one aspect of the present invention, the water outlet pipe is an injected hose. An external connector of the water outlet pipe is manufactured according to the following steps: setting a preformed water outlet pipe in a mold, and forming a connecting pipe coupled with the water outlet pipe at one end of the water outlet pipe via injection molding, the connecting pipe being provided with a receiving recess and at least one receiving slot; setting a resilient snapping component formed with a C-shaped snapping protrusion thereon in the receiving recess of the connecting pipe, setting at least one seal ring in the receiving slot of the connecting pipe, thereby obtaining a quick coupler configured to connect an external water outlet pipe.

According to one aspect of the present invention, the valve body is a concentric valve body. After injection molding of the valve body, a valve cartridge seat is received in a receiving chamber of the valve body via an O-shaped ring with an inner hole of the valve cartridge seat being in communication with the water inlet pipe.

Compared with the prior art, the water inlet pipe, the water outlet pipe and the aluminum casing pipe are safely secured to the valve body via injection molding, which not only can simplify assembly process of the separable water faucet, but also can avoid water leakage risk due to welded connection, thereby remarkably improving production efficiency and avoiding water pollution.

Other advantages and novel features will be drawn from the following detailed description of preferred embodiments with the attached drawings. The accompanying drawings, which are incorporated in and constitute a part of this specification, illustrate embodiments of the present invention and, together with a general description of the invention given above, and the detailed description of the embodiments given below, serve to explain the principles of the invention:

DETAILED DESCRIPTION OF THE INVENTION

Referring to FIGS. 1 to 4, in accordance with a first embodiment of the present invention, a threaded pipe assembly for use in a valve cartridge of a separable water faucet includes an eccentric valve body 10, an aluminum casing pipe 20, a stainless steel cover 30, a water inlet pipe 40 and a water outlet pipe 50. The eccentric valve body 10 is suitably fixed in the aluminum casing pipe 20 via injection molding. The water inlet pipe 40 and the water outlet pipe 50 are suitably secured to the eccentric valve body 10 via injection molding.

The eccentric valve body 10 is an injection molded component. The eccentric valve body 10 defines a number of positioning slots 12 at an outer surface thereof and forms two annular rims 13 at an upper side and a lower side thereof. The annular rim 13 at a lower side defines two snapping recesses 130. The eccentric valve body 10 defines a receiving chamber 14 configured to receive the eccentric valve body 10 and two connecting holes 16 for suitably receiving the water inlet pipe 40 and the water outlet pipe 50 respectively.

The aluminum casing pipe 20 has an inner diameter corresponds to an outer diameter of the eccentric valve body 10. The aluminum casing pipe 20 defines an external thread at an outside wall thereof. The aluminum casing pipe 20 is formed with a number of positioning ribs 22 corresponding to the positioning slots 12 defined in the eccentric valve body 10. The aluminum casing pipe 20 also defines two positioning notches 24 corresponding to the snapping recesses 130 of the eccentric valve body 10 at a lower end thereof.

The stainless steel cover 30 is a circular plate which defines two through holes 32 for suitably receiving the water inlet pipe 40 and the water outlet pipe 50 respectively. The circular stainless steel cover 30 has an inner diameter corresponding to an outer diameter of the eccentric valve body 10. The stainless steel cover 30 is formed with two positioning plates 34 extending towards the eccentric valve body 10. Each positioning plate 34 has a size and shape corresponding to the size and shape of a positioning notch 240 of the aluminum casing pipe 20. Each positioning plate 34 is formed with a protrusion 340 corresponding to a snapping recess 130 of the eccentric valve body 10 on an inner wall thereof.

The water inlet pipe 40 and the water outlet pipe 50 are both injected hoses. The water inlet pipe 40 and the water outlet pipe 50 each has an outer diameter corresponding to the connecting holes 16 of the eccentric valve body 10. The water inlet pipe 40 is formed with a connector 42 at an inlet end thereof. A mounting nut 44 defining an internal thread is set around the connector 42. The mounting nut 44 can be directly connected to an external water inlet pipe having an external thread defined thereon. The mounting nut 44 can also be first connected to an adapter pipe 46 defining external thread and then be connected to an external water inlet pipe defining the internal thread via the adapter pipe 46. To ensure the sealing performance, a sealing gasket 48 is arranged in the mounting nut 44.

Outlet end of the water outlet pipe 50 is provided with a quick connector 52 which can be connected to an external water outlet pipe. The quick connector 52 includes a connecting pipe 522, a resilient snapping component 524 and two seal rings 526. The connecting pipe 522 is coupled to the outlet end of the water outlet pipe 50 via injection molding. The connecting pipe 522 defines a receiving recess 528 and a receiving slot 529. The resilient snapping component 524 is a C-shaped ring having snapping protrusions 525 formed on an outer wall thereof. The resilient snapping component 524 can be received in the receiving recess 528 of the connecting pipe 522. The two seal rings 526 are received in the receiving slots 529 of the connecting pipe 522 respectively. When being connected to an external water outlet pipe, the external water outlet pipe is set around the connecting pipe 522 and the resilient snapping component 524 shrink back to the receiving recess 528 due to the pressure of the external water outlet pipe. When the external water outlet pipe slides along the connecting pipe 522 for a certain distance, a snapping slot defined on the external water outlet pipe registers with the snapping protrusion 525 of the resilient snapping component 524. The snapping protrusion 525 inserts into the snapping slot of the external water outlet pipe due to the resilient force of the resilient snapping component 524, thereby connecting the external water outlet pipe to the water outlet pipe 50. In this case, the two seal rings 526 are seated between the external water outlet pipe and the connecting pipe 522, thereby ensuring desirable sealing performance. In the case of disconnecting the external water outlet pipe, the snapping protrusion 525 is pressed and the external water outlet pipe is disconnected due to the resilient deformation of the resilient snapping component 524.

The method for manufacturing the threaded pipe assembly for use in a valve cartridge of a separable water faucet includes the steps of:

Step 1: setting a preformed water inlet pipe 40 in a mold, and forming a connector 42 which can be connected to the water inlet pipe 40 at one end of the water inlet pipe 40 via injection molding; setting a mounting nut 44 defining external thread around one end of the water inlet pipe 40 without the connector 42 formed thereon, the mounting nut 44 cannot disconnect from the water inlet pipe 40 due to obstruction of the connector 42; determining whether an adapter hose 46 having external thread is needed to be arranged in the mounting nut 44 according to actual requirements, if an adapter hose 46 is needed, using a sealing gasket 48 to obtain sealing performance.

Step 2: setting a preformed water outlet pipe 50 in a mold, and forming a connecting pipe 522 connected to the water outlet pipe 50 at one end of the water outlet pipe 50 via injection molding; coupling the resilient snapping component 524 and the seal rings 526 to the connecting pipe 522 to obtain a quick connector 52. It should be understood that, step 1 and step 2 can be carried out in a random order or at the same time in different production lines.

Step 3: disposing the water inlet pipe 40 and the water outlet pipe 50 in a preformed stainless steel cover 30 and the aluminum casing pipe 20 defining an external thread, and moving the stainless steel cover 30 to the ends of the water inlet pipe 40 and the water outlet pipe 50 afar from the eccentric valve body 10; setting the aluminum casing pipe 20 defining external thread, the water inlet pipe 40 and the water outlet pipe 50 in a mold as a mold insert, forming an eccentric valve body 10 via injection molding, such that the water inlet pipe 40, the water outlet pipe 50 and the aluminum casing pipe 20 is securely coupled to the eccentric valve body 10, and further removing the assembly from the mold. In this case, the positioning ribs 22 of the aluminum casing pipe 20 are positioned in corresponding positioning slots 12 of the eccentric valve body 10 to prevent the eccentric valve body 10 from rotating relative to the aluminum casing pipe 20. The positioning notches 24 at a lower side of the aluminum casing pipe 20 register with the snapping recesses 130 of the eccentric valve body 10.

Step 4: moving the stainless steel cover 30 toward the eccentric valve body 10 until the protrusion 340 of the stainless steel cover 30 seated in the snapping recess 130 of the eccentric valve body 10, so that the stainless steel cover 30 is fixed to one end of the eccentric valve body 10.

Figure 1:
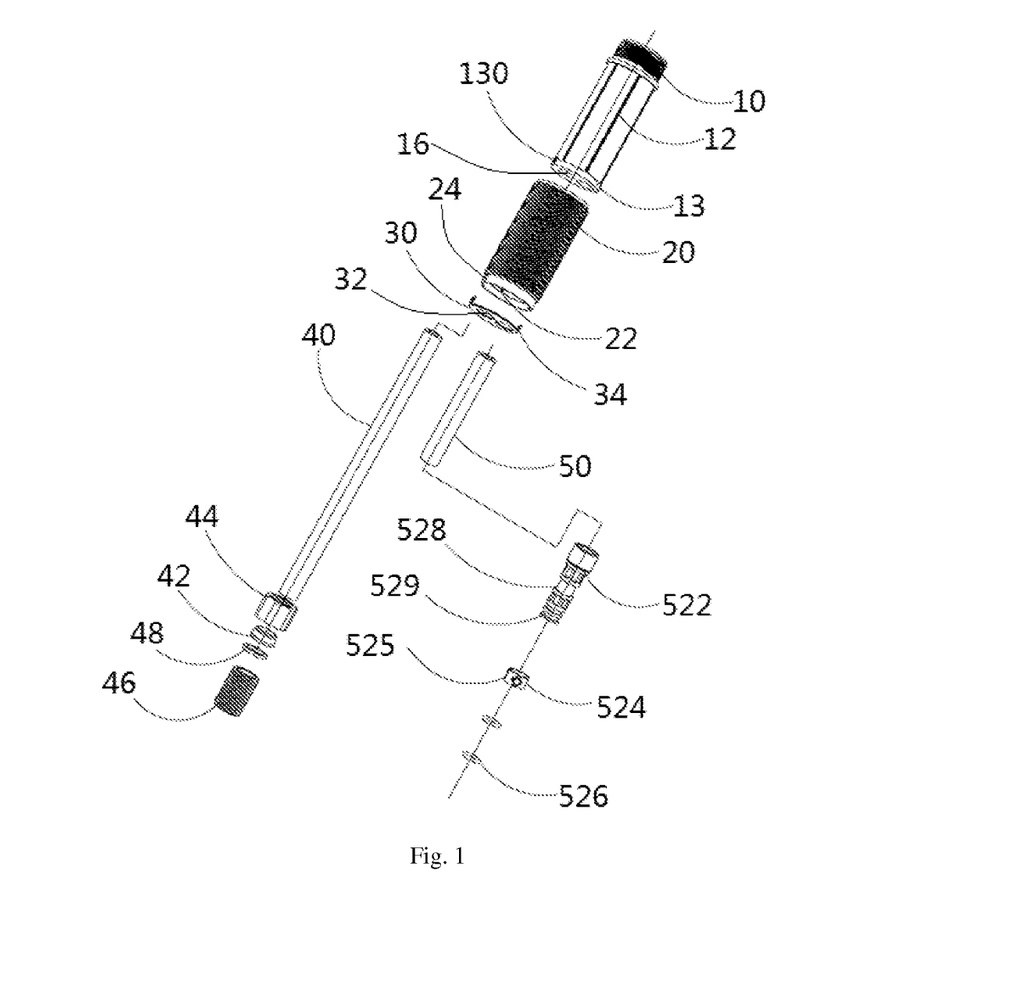
FIG. 1 depicts an exemplary perspective view of a threaded pipe assembly for use in a valve cartridge of a separable water faucet according to a first embodiment of the present invention.
Figure 2:
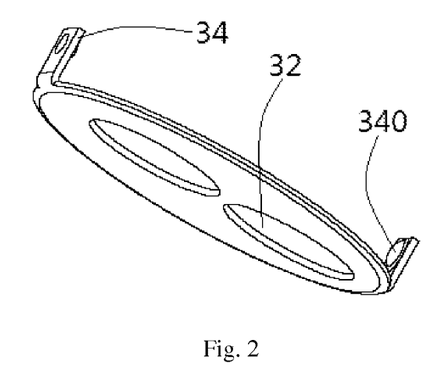
FIG. 2 depicts an exemplary enlarged view of a stainless steel cover shown in FIG. 1.
Figure 3:
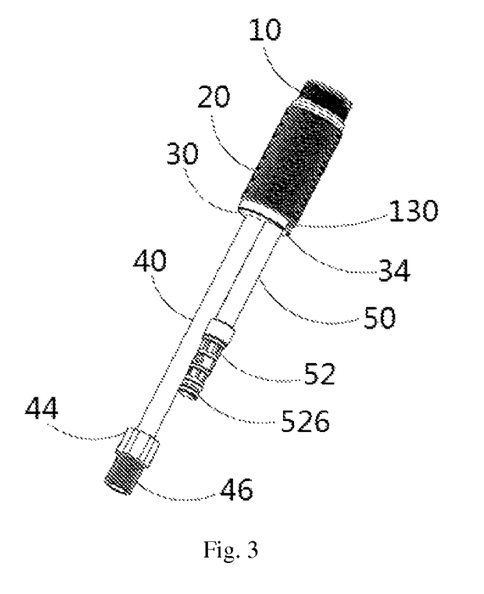
FIG. 3 depicts an exemplary assembled view of the threaded pipe assembly for use in a valve cartridge of a separable water faucet according to the first embodiment of the present invention.
Figure 4:
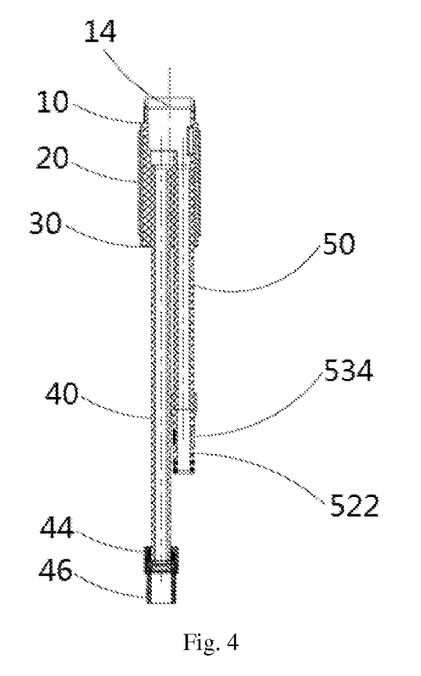
FIG. 4 depicts an exemplary cross-sectional view of the threaded pipe assembly for use in a valve cartridge of a separable water faucet according to the first embodiment of the present invention.
Figure 5:
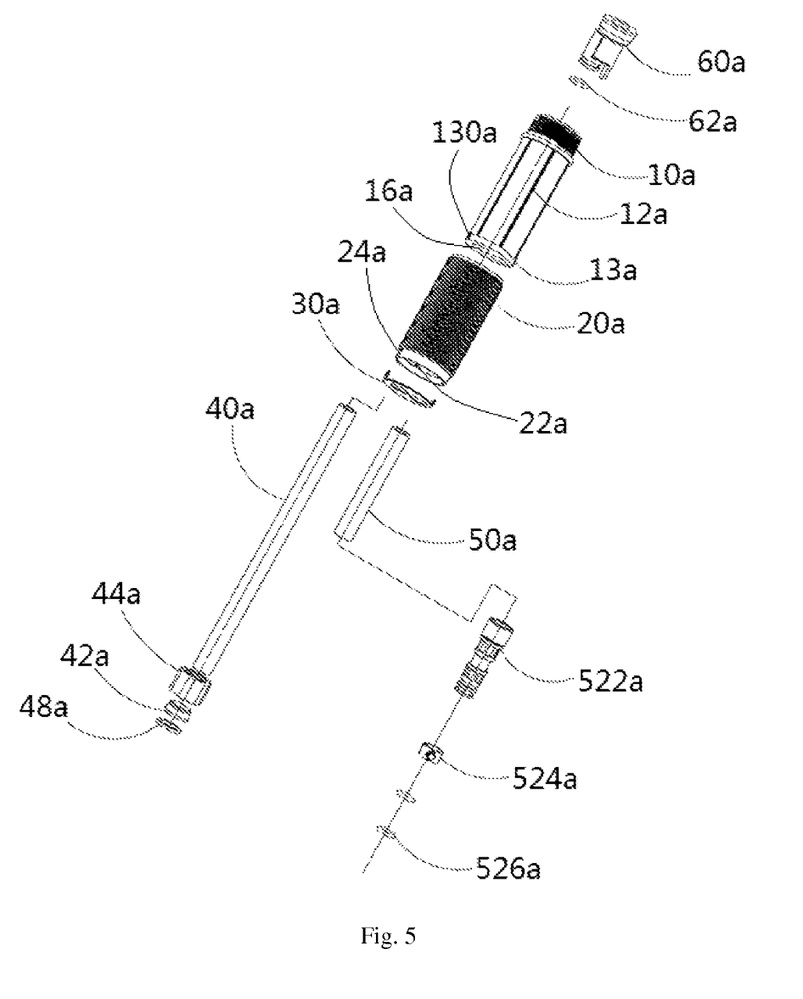
FIG. 5 depicts an exemplary perspective view of a threaded pipe assembly for use in a valve cartridge of a separable water faucet according to a second embodiment of the present invention.
Figure 6:
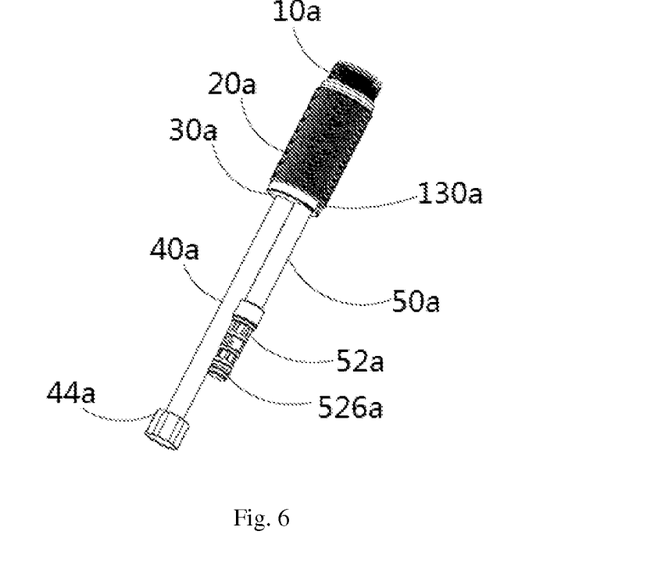
FIG. 6 depicts an exemplary assembled view of a threaded pipe assembly for use in a valve cartridge of a separable water faucet according to the second embodiment of the present invention.
Figure 7:
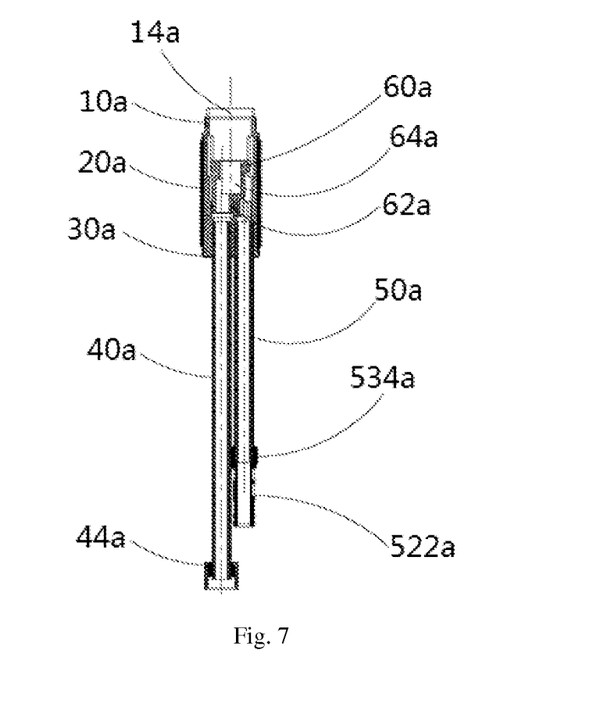
FIG. 7 depicts an exemplary cross-sectional view of a threaded pipe assembly for use in a valve cartridge of a separable water faucet in accordance with the second embodiment of the present invention.

Referring to FIGS. 5 to 7, according to a second embodiment of the present invention, a threaded pipe assembly for use in a valve cartridge of a separable water faucet includes a concentric valve body 10*a*, an aluminum casing pipe 20*a*, a stainless steel cover 30*a*, a water inlet pipe 40*a*, a water outlet pipe 50*a* and a valve cartridge seat 60*a*. The concentric valve body 10*a* is suitably fixed in the aluminum casing pipe 20*a* via injection molding. The water inlet pipe 40*a* and the water outlet pipe 50*a* are suitably secured in the concentric valve body 10*a* via injection molding. The valve cartridge seat 60*a* is set in the concentric valve body 10*a*.

The concentric valve body 10*a* is also a single injection molded component which has similar structure to that of the eccentric valve body 10 in the first embodiment of the present invention. The concentric valve body 10*a* defines a number of positioning slots 12*a* at an outer surface thereof and two annular rims 13*a* at an upper side and a lower side thereof. The annular rim 13*a* at a lower side defines two snapping recesses 130*a*. The concentric valve body 10*a* defines a receiving chamber 14*a* for receiving the eccentric valve body 10 and two connecting holes 16*a* for suitably receiving the water inlet pipe 40*a* and the water outlet pipe 50*a* respectively.

The aluminum casing pipe 20*a*, the stainless steel cover 30*a*, the water inlet pipe 40*a* and the water outlet pipe 50*a* each has same structure as previously described in the first embodiment of the present invention and will not be detailed any more. It should be understood that, although FIGS. 5 to 7 do not show an adapter hose for connecting one end of the water inlet pipe 40*a* and the mounting nut 44*a*, the mounting nut 44*a* can be directly connected to an external water inlet pipe having external thread defined thereon. The mounting nut 44*a* can also be first connected to an adapter pipe defining external thread and then be connected to a water inlet pipe defining internal thread via the adapter pipe.

The valve cartridge seat 60*a* in the second embodiment of the present invention is also a single injection molded component. The valve cartridge seat 60*a* can be received in the receiving chamber 14*a* of the concentric valve body 10*a* via an O-shaped ring 62*a*, and further be connected to the water inlet pipe 40*a* via an internal hole 64*a*.

The method for manufacturing the threaded pipe assembly for use in a valve cartridge of a separable water faucet according to the second embodiment of the present invention is almost as same as that has been previously detailed in the first embodiment of the present invention except that the installation of the concentric valve body 10*a* after step 3 or step 4. More specifically, the method according to the second embodiment of the present invention includes the steps of:

Step1: forming a connector 42a at one end of a water inlet pipe 40a via injection molding, and assembling a mounting nut 44a, a sealing gasket ring 48a, and an adapter pipe if necessary;

Step 2: forming a connecting pipe 522a at one end of the water outlet pipe 50a via injection molding; coupling a resilient snapping component 524a and seal rings 526a to the connecting pipe 522a to obtain a quick connector 52a. It should be understood that, step 1 and step 2 can be carried out in random order or at same time in different production lines.

Step 3: setting the water inlet water pipe 40a and the water outlet pipe 50a in a preformed stainless steel cover 30a and an aluminum casing pipe 20a defining external thread in turn, and moving the stainless steel cover 30a to ends of the water inlet pipe 40a and the water outlet pipe 50a afar from the concentric valve body 10a; setting the aluminum casing pipe 20a defining external thread, the water inlet pipe 40a and the water outlet pipe 50a in a mold as a mold insert, forming an concentric valve body 10a via injection molding so that the concentric valve body 10a is securely coupled with the water inlet pipe 40a, the water outlet pipe 50a and the aluminum casing pipe 20a, and removing the assembly from the mold. In this case, the positioning ribs 22a of the aluminum casing pipe 20a are seated in corresponding positioning slots 12a of the concentric valve body 10a, thereby preventing the concentric valve body 10a from rotating relative to the aluminum casing pipe 20a. The positioning notches 24a at a lower side of the aluminum casing pipe 20a register with the snapping recesses 130a of the concentric valve body 10a.

Step 4: moving the stainless steel cover 30a toward the concentric valve body 10a until the protrusions 340 of the stainless steel cover 30a seated in the snapping recesses 130a defined in the concentric valve body 10a, so that the stainless steel cover 30a is securely fixed to one end of the concentric valve body 10a.

Step 5: setting the valve cartridge seat 60a in the receiving chamber 14a of the concentric valve body 10a via an O-shaped ring 62a, with an inner hole 64a defined in the valve cartridge seat 60a in communication with the water inlet pipe 40a. Step 4 and step 5 can be carried out in a random order or at same time in different production lines.

In view of the detailed description of the embodiments of the present invention, the valve body 10, 10a of the threaded pipe assembly for use in a valve cartridge of a separable water faucet is safely coupled with the water inlet pipe 40, 40a, the water outlet pipe 50, 50a and the aluminum casing pipe 20, 20a via injection molding, which not only can simplify assembly process, but also can avoid leakage risk due to welded connection, thereby remarkably improving the production efficiency and avoiding water pollution. In addition, most of the threaded pipe assembly is made from plastic materials, which can protect the surroundings. What is more, the quick connector 52, 52a provided on the water outlet pipe 50, 50a can facilitate connection of the water outlet pipe 50,50a with the external water outlet pipe. The stainless steel cover 30, 30a can improve appearance of the threaded pipe assembly.

While the present invention has been illustrated by the above description of the preferred embodiments thereof, while the preferred embodiments have been described in considerable detail, it is not intended to restrict or in any way to limit the scope of the appended claims to such details. Additional advantages and modifications within the spirit and scope of the present invention will readily appear to those ordinary skilled in the art. Consequently, the present invention is not limited to the specific details and the illustrative examples as shown and described.

What is claimed is:

1. A threaded pipe assembly for use in a valve cartridge of a separable water faucet, the threaded pipe assembly comprising:
   a valve body,
   an aluminum casing pipe defining an external thread,
   a water inlet pipe and a water outlet pipe,
   wherein the valve body is fixed in the aluminum casing pipe via injection molding, and the water inlet pipe and the water outlet pipe are also fixed to the valve body via injection molding.

2. The threaded pipe assembly of claim 1, further comprising a stainless steel cover secured to one end of the valve body, the stainless steel cover defines two through holes for suitably receiving the water inlet pipe and the water outlet pipe respectively.

3. The threaded pipe assembly of claim 2, wherein the valve body is a single injection molded component defining at least two snapping recesses at one end thereof, the stainless steel cover is a circular plate having an inner diameter corresponding to an outer diameter of the valve body and being provided with at least two positioning ribs each forming a protrusion extending towards a corresponding snapping recess of the valve body, and the stainless steel cover is fixed to one end of the valve body via engagement of the protrusions and the snapping recesses.

4. The threaded pipe assembly of claim 1, wherein the water inlet pipe and the water outlet pipe are both injected hoses.

5. The threaded pipe assembly of claim 4, wherein an inlet end of the water inlet pipe is formed with a connector and a mounting nut defining internal thread is set around the connector.

6. The threaded pipe assembly of claim 5, wherein the mounting nut is coupled with an adapter hose having an external thread, and a sealing gasket is disposed between the mounting nut and the adapter hose.

7. The threaded pipe assembly of claim 4, wherein an outlet end of the water outlet pipe is formed with a clip-on quick connector configured to be connected to an external water outlet pipe.

8. The threaded pipe assembly of claim 7, wherein the quick connector comprises a connecting pipe secured to an outlet end of the external water outlet pipe via injection molding and defining a receiving recess and at least one receiving slot, a resilient snapping component having a snapping protrusion formed thereon received in the receiving recess of the connecting pipe, and at least one seal ring received in the at least one receiving slot.

9. The threaded pipe assembly of claim 1, wherein the valve body is a single injection molded component defining at least two positioning slots at an outer surface thereof, the aluminum casing pipe has an inner diameter corresponding to an outer diameter of the valve body, and the aluminum casing pipe is formed with at least two positioning ribs corresponding to the positioning slots of the eccentric valve body.

10. The threaded pipe assembly of claim 1, wherein the valve body defines a receiving chamber configured to suitably receive a valve cartridge and two connecting holes configured to suitably receive the water inlet pipe and the water outlet pipe respectively.

11. The threaded pipe assembly of claim 10, wherein the valve body is an eccentric valve body or a concentric valve body.

12. The threaded pipe assembly of claim 11, further comprising a valve cartridge seat defining an inner hole, the valve cartridge seat is seated in the receiving chamber of the concentric valve body and in communication with the water inlet pipe via the inner hole.

13. A method for manufacturing a threaded pipe assembly for use in a valve cartridge of a separable water faucet, comprising the steps of:
  1) providing a preformed water inlet pipe and a preformed water outlet pipe, providing external connectors for the water inlet pipe and the water outlet pipe respectively; and
  2) setting a preformed aluminum casing pipe defining an external thread, the water inlet pipe and the water outlet pipe in a mold and obtaining a valve body via injection molding, the molded valve body being fixed in the aluminum casing pipe.

14. The method of claim 13, wherein prior to setting the aluminum casing pipe, the water inlet pipe and the water outlet pipe in the mold, the water inlet pipe and the water outlet pipe extend through a preformed stainless steel cover which can be moved to ends of the water inlet pipe and the water outlet pipe afar from the aluminum casing pipe, and the stainless steel cover is moved to the valve body and coupled to one end of the valve body via clip-on connection after the molded valve body being removed from the mold.

15. The method of claim 13, wherein the water inlet pipe is a injected hose, an external connector of the water inlet pipe can be manufactured according to the following steps: setting a preformed water inlet pipe in a mold and forming a connector coupled with the water inlet pipe at one end of the water inlet pipe via injection molding; and setting a mounting nut defining internal thread around the water inlet pipe from one end of the water inlet pipe without connector formed thereon, the mounting nut being not capable of being disconnected from the water inlet pipe due to obstruction of the connector.

16. The method of claim 15, wherein after setting the mounting nut around the water inlet pipe, an adapter hose defining an external thread is connected to the mounting nut and a sealing gasket is set between the mounting nut and the adapter hose.

17. The method of claim 13, wherein the water outlet pipe is an injected hose, an external connector of the water outlet pipe is manufactured according to the following steps:
  setting a preformed water outlet pipe in a mold, and forming a connecting pipe coupled with the water outlet pipe at one end of the water outlet pipe via injection molding, the connecting pipe being provided with a receiving recess and at least one receiving slot;
  setting a resilient snapping component formed with C-shaped snapping protrusion in the receiving recess of the connecting pipe, setting at least one seal ring in the receiving slot of the connecting pipe, and obtaining a quick coupler configured to connect an external water outlet pipe.

18. The method of claim 13, wherein the valve body is a concentric valve body, after injection molding of the valve body, a valve cartridge seat is received in a receiving chamber of the valve body via an O-shaped ring with an inner hole of the valve cartridge seat being in communication with the water inlet pipe.

* * * * *